United States Patent

Nemoto

[11] Patent Number: 5,617,936
[45] Date of Patent: Apr. 8, 1997

[54] SYNCHROMESH CHANGE TRANSMISSION HAVING A NEUTRAL BRAKE

[75] Inventor: Shusuke Nemoto, Yao, Japan

[73] Assignee: Kanzaki Kokyukoki Mfg. Co., Ltd., Amagasaki, Japan

[21] Appl. No.: 555,699

[22] Filed: Nov. 14, 1995

[30] Foreign Application Priority Data

Dec. 2, 1994 [JP] Japan .................................. 6-329443

[51] Int. Cl.⁶ .................................................. B60K 41/28
[52] U.S. Cl. ..................... 192/4 A; 192/4 R; 192/13 R; 192/48.91; 74/15.63
[58] Field of Search ..................... 192/4 A, 4 R, 192/4 C, 13 R, 48.91, 4 B; 74/15.63, 15.66, 15.69

[56] References Cited

U.S. PATENT DOCUMENTS

| | | | |
|---|---|---|---|
| 2,943,515 | 7/1960 | Isaacson et al. | 74/15.63 X |
| 4,360,091 | 11/1982 | Sada et al. | 192/4 B |
| 4,750,580 | 6/1988 | Umemoto | 74/15.63 X |
| 5,381,878 | 1/1995 | Ohshima et al. | 192/4 A |

FOREIGN PATENT DOCUMENTS

52-160770 12/1977 Japan .
59-166053 11/1984 Japan .

*Primary Examiner*—Andrea L. Pitts

[57] ABSTRACT

In a synchromesh change transmission which is disposed between parallel aligned input and output shafts (12, 13) and includes synchronizer clutches (34, 35) mounted on the input shaft, a neutral brake (45) is disposed on the output shaft in a face-to-face relationship, as viewed in a direction across the shafts, with one (35) of the clutches. The brake comprises a cylindrical member (46), as a stationary brake member, which is engaged by an element (37) of the one clutch so as to be prevented from a rotational displacement. First and second sets of frictional elements (48, 49) of the brake are supported respectively by the output shaft and by the cylindrical member. The brake is adapted to be actuated by a control mechanism (59) for the clutches in a neutral condition of the change transmission preferably through a sliding rod (66) and through a rotatable ring member (54) mounted on the output shaft. A simple and compact arrangement of the brake mechanism is provided.

8 Claims, 8 Drawing Sheets

SYNCHROMESH CHANGE TRANSMISSION HAVING A NEUTRAL BRAKE

FIELD OF THE INVENTION

This invention relates to a vehicle transmission. More particularly, the present invention relates to a transmission having a synchromesh change mechanism which is disposed between parallel aligned input and output shafts. The change mechanism includes synchronizer clutches which are mounted on the input shaft.

BACKGROUND OF THE INVENTION

Vehicle transmissions of the type set forth above are well known to the art as shown, for example, in JP, U No. 52-160770. A speed change transmission performed between input and output shafts is usually accompanied by a speed reduction between the shafts so that torque is higher at the output shaft than at the input shaft. Consequently, a synchronizer clutch mounted on an input shaft of low torque may be of a small capacity as compared to a synchronizer clutch mounted on an output shaft of high torque.

With respect to such a vehicle transmission, an unexpected start of the vehicle has sometimes been experienced at a neutral condition of the synchromesh change mechanism due to some torque transmitted through a synchronizer clutch of a neutral condition. Such a torque transmission may be caused by a drag effect of viscous lubricant oil existing between the input shaft and a change gear which is rotatably mounted on the input shaft and is to be coupled to this shaft by the synchronizer clutch. The torque is transmitted from the change gear to another gear, which is fixedly mounted on the output shaft and is in constant mesh with the former change gear, and then to the output shaft so as to cause a rotation of this shaft.

A simple solution to this problem is that the output shaft is associated with a brake which constantly applies a relatively small braking force to this shaft. Such a brake is known, for example, from JP, U No. 59-166053. However, a brake of this type is operable to brake the shaft even when the vehicle is traveled under an operated condition of the change mechanism. This is not preferred in view of energy loss resulting therefrom and in view of durability of the brake.

Accordingly, a primary object of the present invention is to provide a vehicle transmission in which a synchromesh change mechanism including synchronizer clutches is associated with a brake which is operable to brake the output shaft of the change mechanism only at the neutral condition of this mechanism and which is arranged in a dead space within the change mechanism such that it is easily connectable to a control mechanism for the synchronizer clutches so as to be actuated in the neutral condition of the change mechanism.

An attendant object of the invention is that the brake is provided in a simple and compact fashion.

A further attendant object is to provide a vehicle transmission in which the brake is operated in response to the shifting operation of the change mechanism through operating means which does not restrict the arrangement of another mechanisms.

SUMMARY OF THE INVENTION

The present invention relates to a vehicle transmission having a synchromesh speed-change mechanism (14) disposed between an input shaft (12) and an output shaft (13) which extend parallel with each other. The change mechanism (14) includes synchronizer clutches (34, 35) which are mounted on the input shaft (12). In accordance with the present invention, a brake (45) is disposed on the output shaft (13) in a face-to-face relationship, as viewed in a direction across the input and output shafts, with one (35) of the synchronizer clutches on the input shaft (12). The brake (45) is operatively connected to a control mechanism (59) for controlling the operation of the synchronizer clutches (34, 35) such that the brake is actuated so as to brake the output shaft (13) when the change mechanism (14) is placed in its neutral condition.

In a synchromesh speed-change mechanism in which synchronizer clutches are mounted on the input shaft, a set of drive gears which are selectively coupled to the input shaft one at a time are rotatably mounted on this input shaft. A set of driven gears, which are in constant mesh with the drive gears on the input shaft, are fixedly mounted on the output shaft in an arrangement such that each two adjacent driven gears are spaced axially from each other by an interval which corresponds to the axial width of each synchronizer clutch on the input shaft. Such an interval leaves a dead space within the change mechanism. The brake (45) set forth above is provided using such a dead space so that it does not require an additional space. Because the brake (45) is located in close proximity to the synchronizer clutch (35), it is easily connectable to a control mechanism for the synchronizer clutch so as to be actuated at the neutral condition of the change mechanism.

Preferably, the brake (45) is composed of a frictional brake having, as a stationary brake member for supporting non-rotatable frictional elements (49), a hollow cylindrical member (46) which is disposed on the output shaft (13) and is engaged by one element of the synchronizer clutch (35), such as a shifter (37), such that the cylindrical member is kept from a rotational displacement by the clutch element. The other friction elements (48) of the friction brake are supported by the output shaft (13) for co-rotation therewith. The stationary brake member or cylindrical member (46) which is kept from a rotational displacement by utilizing the synchronizer clutch (35) adjacent thereto will eliminate a stationary brake member fixedly supported by a transmission casing and will provide a simple and compact structure for the frictional brake.

The cylindrical member (46) may be mounted on the output shaft (13) for a sliding displacement such that the frictional elements (48, 49) of the brake are engaged and disengaged in response to a sliding displacement of the cylindrical member. Alternatively, the cylindrical member (46) may be non-slidably mounted on the output shaft (13) such that pressure means (85, 87) for causing engagement between the frictional elements (48, 49) is supported by the cylindrical member movably in an axial direction of the output shaft (13). The former or slidable cylindrical member (46) is operatively connected to the clutch-control mechanism (59), whereas the pressure means (85, 87) movably supported by the latter or non-slidable cylindrical member (46) is operatively connected to the clutch-control mechanism (59). In any of these structures, brake-operating mechanism is accommodated within the space occupied by the cylindrical member (46) so that compactness of the brake mechanism is maintained.

Preferably, a ring member (54), which causes by its rotational displacement a sliding or axial displacement of the slidable cylindrical member (46) or of the brake-actuating pressure means (85, 87) through a cam mechanism, is rotatably mounted on the output shaft (13) and is operatively connected to the clutch-control mechanism (59) through a slidable rod (66) such that the ring member is rotationally displaced in response to a sliding dispacement of the rod. The rod may be supported by the cylindrical member (46). In this structure, the ring member (54) can be arranged within the above-referenced dead space without any difficulty. Contrary to a link mechanism having plural rockable links, the sliding rod (66) as connecting means does not restrict the arrangement of another mechanisms.

A control mechanism for controlling the operation of synchronizer clutches of a speed change mechanism generally includes plural slidable fork-support shafts which are arranged in parallel with one another. In a preferred embodiment of the present invention, such fork-support shafts (60, 61) are provided with cam surfaces (60c, 61c) which are engaged by the brake-operating rod (66) such that the rod is slidingly moved in response to a sliding displacement of the fork-support shafts. This structure contributes to reducing the number of parts.

BRIEF DESCRIPTION OF THE DRAWINGS

The present invention and its attendant advantages will become more readily apparent as the specification is considered in conjunction with the accompanying drawings in which.

DESCRIPTION OF PREFERRED EMBODIMENTS

Figure 1:
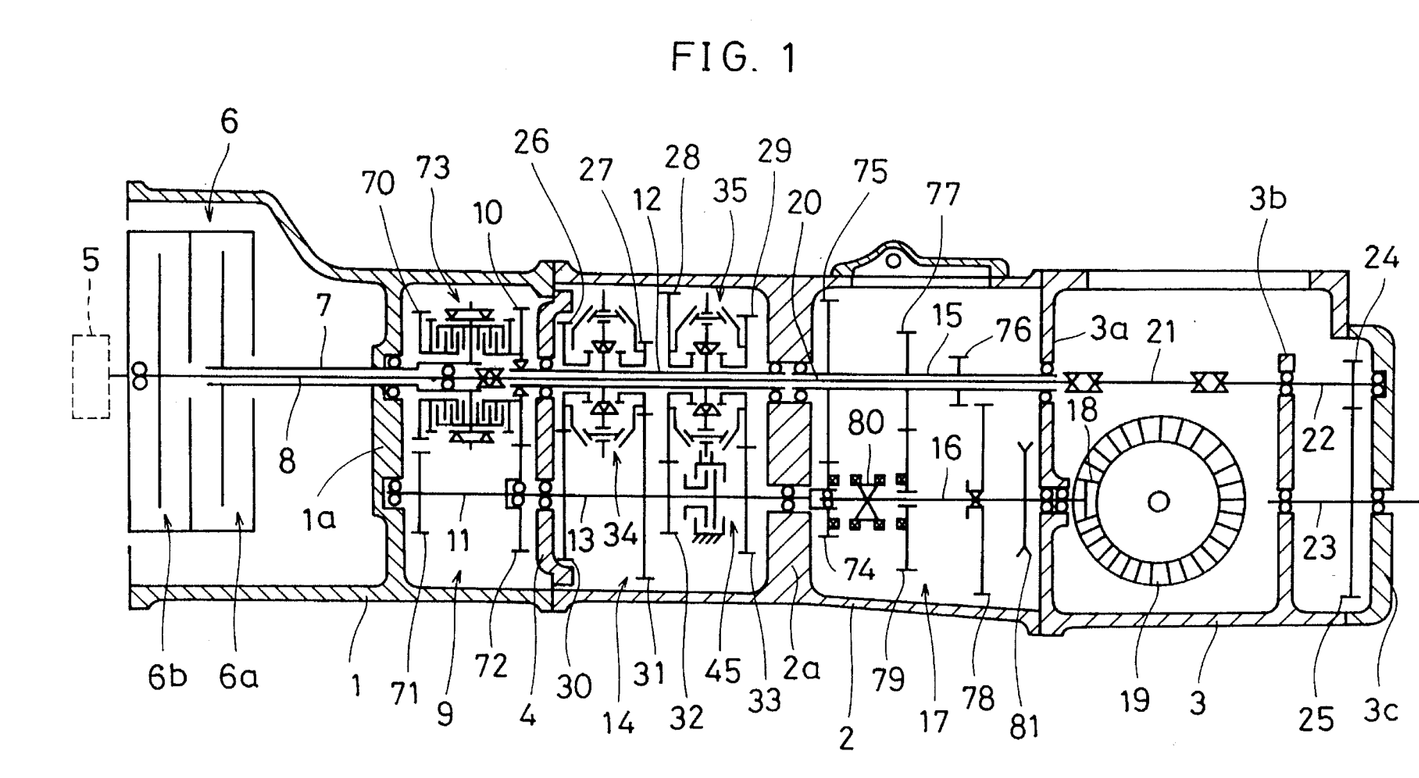
FIG. 1 is a schematic sectional side view showing the whole of the transmission system of a tractor in which a first preferred embodiment of the transmission according to the present invention is employed.

FIG. 1 shows schematically the whole of the transmission system of a tractor in which a preferred embodiment of the present invention is employed. The vehicle body of the tractor shown is composed of a front housing 1, transmission casing 2 and rear housing 3 which are arranged in series in a longitudinal direction of the tractor and are fastened together. Front housing 1 includes an open front end, an open rear end and an internal partition wall 1a. A bearing support frame 4, which is fixedly secured to a rear of the front housing 1, is disposed within a rear end portion of this housing 1. Transmission casing 2 includes an open front end, an open rear end and an internal support wall 2a. Rear housing 3 includes a front wall 3a, an internal support wall 3b which upstands from the inner bottom of this housing 3, and an open rear end which is closed by a rear end cover 3c.

As also shown in FIG. 1, engine 5 is arranged at a frontmost end of the vehicle body. Within the front housing 1, there are disposed a hollow primary shaft 7 of the vehicle drive-power transmission line and a primary shaft 8 of the power take-off transmission line. These shafts are driven to rotate by engine 5 through a main clutch mechanism 6. Shaft 7 of the vehicle drive-power transmission line extends axially of the vehicle through the partition wall 1a, and shaft 8 of the power take-off transmission line extends through the hollow shaft 7. The main clutch mechanism 6 comprises a main clutch 6a of the vehicle drive-power transmission line and a main clutch 6b of the power take-off transmission line. These main clutches are operated by individual operating mechanisms (not shown).

Within the front housing 1, a direction-reversing mechanism 9 is disposed at a location between the partition wall 1a and the bearing support frame 4. This reversing mechanism 9 is operable to transmit the rotation of the primary shaft 7 to an output gear 10 forward-directionally and backward-directionally. The mechanism 9 includes a countershaft 11 which is disposed in parallel with the primary shaft 7.

A hollow input shaft 12 at a high level and an output shaft 13 at a low level are disposed within the transmission casing 2 and are supported by the bearing support frame 4 and by the support wall 2a, respectively. Input shaft 12 is disposed co-axially with primary shaft 7, and it extends forwardly of the bearing support frame 4. Output gear 10 of the reversing mechanism 9 is fixedly mounted on a front end portion of this input shaft 12. Similarly, output shaft 13 is disposed co-axially with the countershaft 11, and it extends forwardly of the bearing support frame 4. Countershaft 11 is rotatably journaled at its rear end portion by a front end portion of the output shaft 13. Within a front half of the transmission casing 2, a primary speed change mechanism 14 is disposed and is operable to perform a speed change transmission between the input shaft 12 and the output shaft 13.

Within a rear half of the transmission casing 2, there are disposed a hollow intermediate shaft 15 which is located behind and co-axially with the input shaft 12, a propeller shaft 16 which is located behind and co-axially with the output shaft 13, and an auxiliary speed change mechanism 17 which is operable to perform a speed change transmission between the output shaft 13 and the propeller shaft 16. Propeller shaft 16 extends into the rear housing 3 and has, at its rear end, a small bevel gear 18 which is meshed with a larger input bevel gear 19 of a differential gearing for left and right rear wheels (both not shown) so that the vehicle is driven to travel by the drive of the left and right rear wheels.

Primary shaft 8 of the power take-off line is connected to a transmission shaft 20 which extends through the hollow input shaft 12 and intermediate shaft 15, and then to two transmission shafts 21 and 22 which are disposed in series within the rear housing 3. A PTO shaft 23, which is driven to rotate by the transmission shaft 22 through speed-reduction meshing gears 24 and 25, is supported by the support wall 3b and by the rear end cover 3c and extends rearwardly from the vehicle body.

Figure 2:
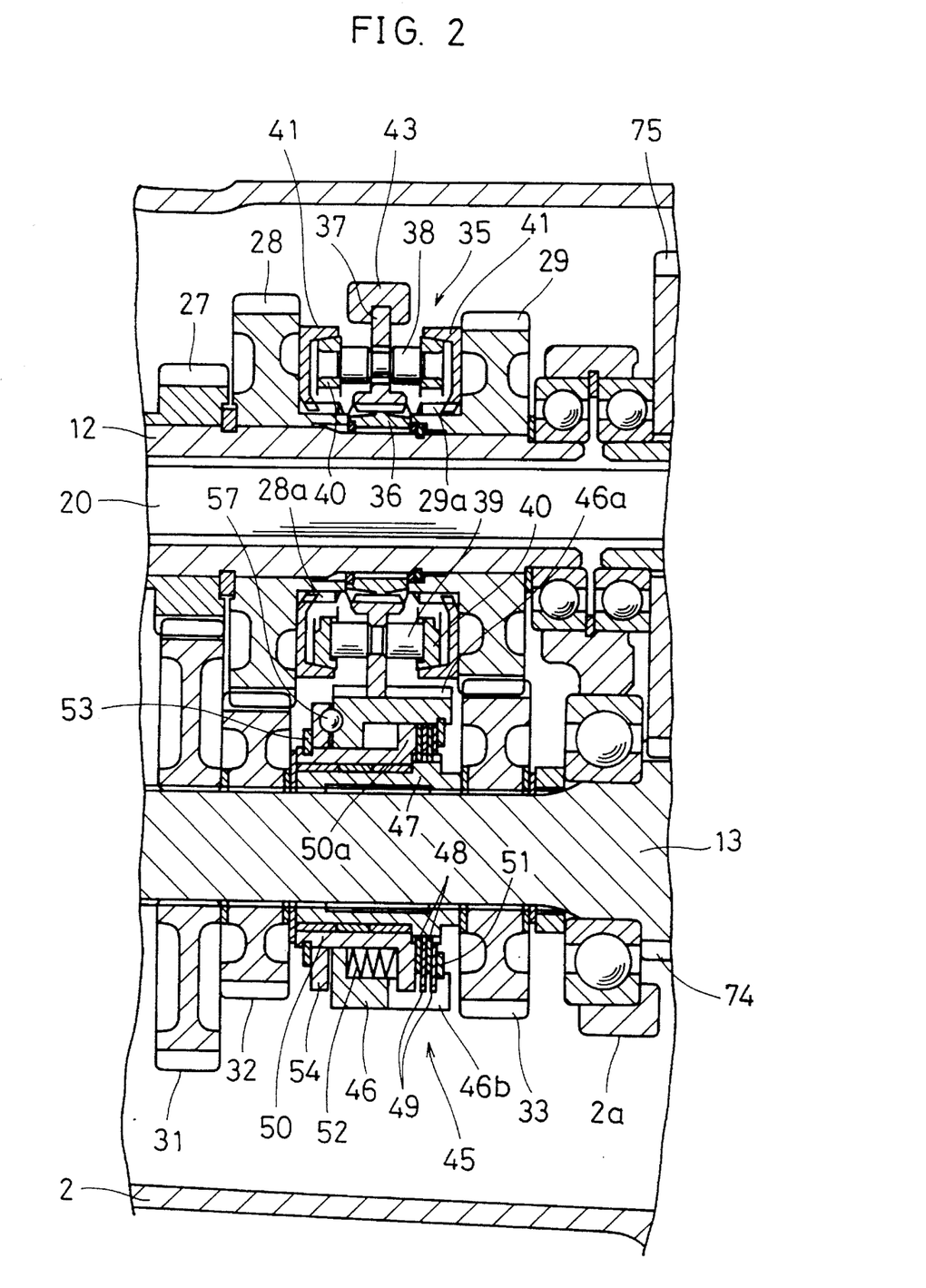
FIG. 2 is a sectional side view of a part of the tractor.

As shown in FIGS. 1 and 2, the primary speed change mechanism 14 is fashioned into a synchromesh change mechanism. This mechanism 14 includes four constant-mesh gear trains composed of four gears 26, 27, 28 and 29 which are rotatably mounted on the input shaft 12, and four gears 30, 31, 32 and 33 which are fixedly mounted on the output shaft 13 and are meshed respectively with the gears 26–29 on the input shaft 12. Two double-acting synchronizer clutches 34 and 35 are mounted on the input shaft 12 at a location between gears 26 and 27 and at another location between gears 28 and 29 for selectively coupling gears 26–29 one at a time to the input shaft.

Each of the synchronizer clutches 34 and 35 shown is fashioned into a cone synchronizer clutch of pin type, as shown in FIG. 2 with respect to clutch 35. The double-acting synchronizer clutch 35 comprises a splined hub 36 which is fixedly mounted on the input shaft 12, a shifter 37 which is spline-fitted on the splined hub 36, one or more synchronizing pins 38, and one or more thrust pins 39. These clutch members 36 to 39 are common to a pair of clutch portions of the double-acting clutch 35. As is usual, splines 28a and 29a which are aligned with splines of the splined hub 36 are formed in the boss portions of gears 28 and 29. First cones 40 are secured to the ends of synchronizing pins 38, while second cones 41 are co-rotatably mounted on the boss portions of gears 28 and 29 using splines 28a and 29a. Shifter 37 is adapted to be displaced towards gear 28 or 29 using a shifter fork 43. In operation, a displacement of the shifter 37 causes thrust pins 39 to push the first cone 40 and to thereby start up a frictional engagement between the first and second cones 40 and 41. While a further displacement of the shifter 37 is restrained by an engagement between a tapered surface in a middle stepped portion of the synchronizing pin 38 and a tapered surface in an inner wall of the pin-passing bore in the shifter 37, the first and second cones 40 and 41 are fully engaged so that a synchronous rotation is attained. Consequently, a further displacement of the shifter 37 is caused so as to mesh with splines 28a or 29a so that gear 28 or 29 is coupled to the input shaft 12.

Figure 3:
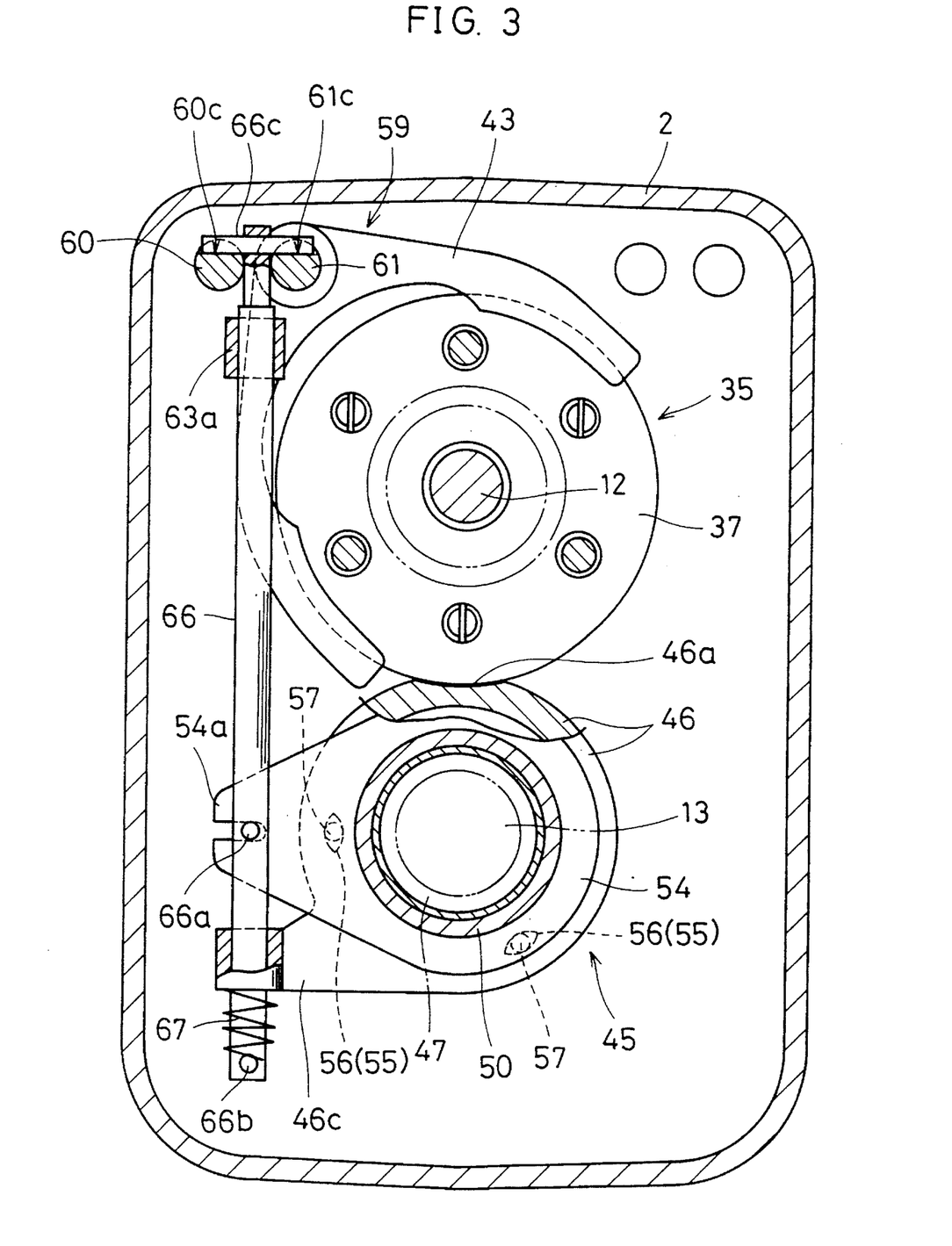
FIG. 3 is a vertical sectional view, partially omitted, of a part of the tractor.
Figure 4:
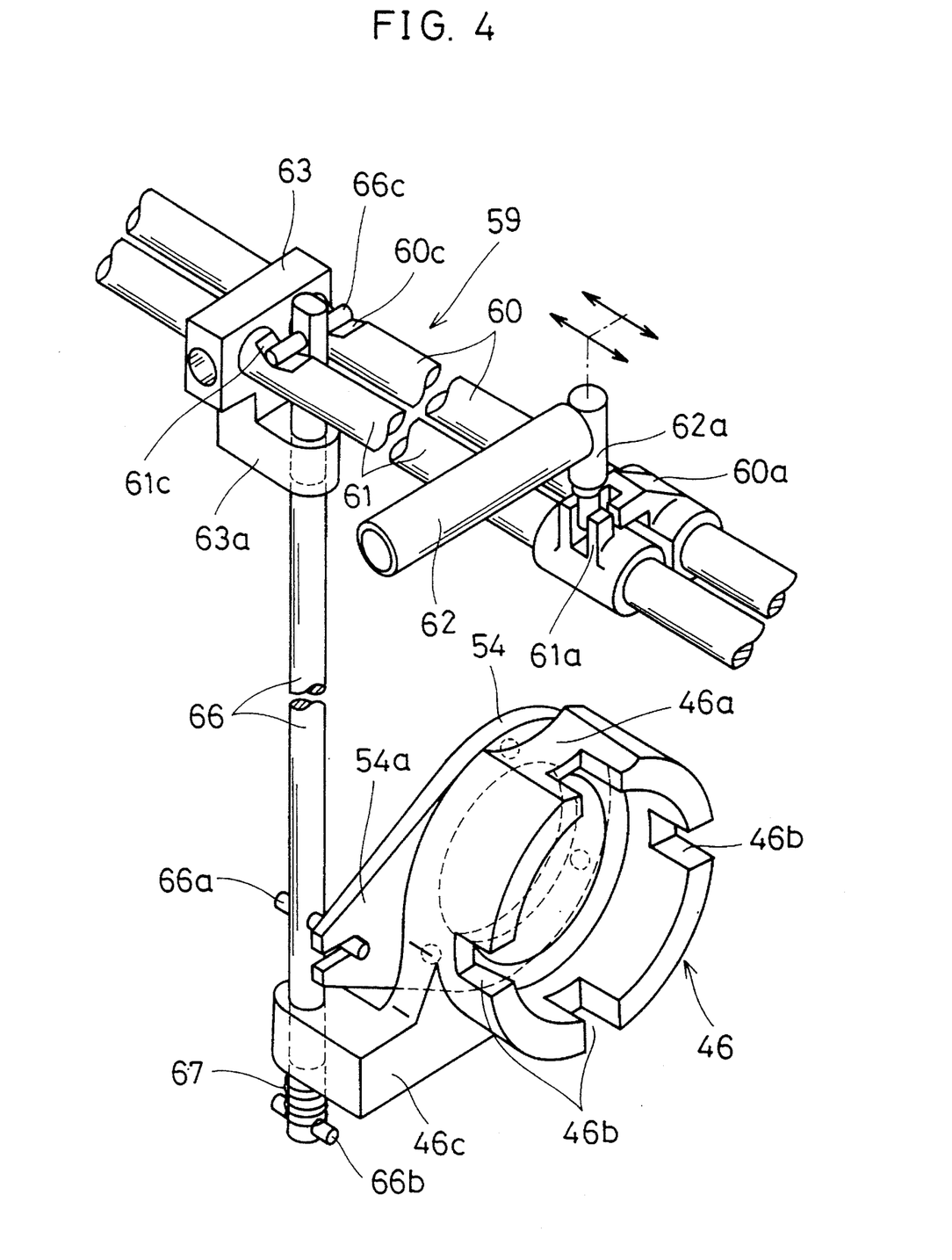
FIG. 4 is a perspective view showing some members of the embodiment.

As shown in FIGS. 1 and 2, a brake 45 is disposed on the output shaft 13 in a face-to-face relationship, as viewed in a direction across the input and output shafts 12 and 13, with the synchronizer clutch 35 on the input shaft 12. As shown in FIGS. 2 to 4, this brake 45 comprises a hollow cylindrical member 46 which is disposed on the output shaft 13. This cylindrical member 46 includes, in an upper portion of its outer surface, an arc-shaped recess 46a into which a lower portion of the shifter 37 of the synchronizer clutch 35 extends such that the cylindrical member 46 is kept from a rotational displacement by an engagement of the inner wall of the recess with 46a with the shifter 37. Rotation of the shifter 37 is permitted through the arced shape of recess 46a, while axial displacement of the shifter is permitted through an elongated axial length of the recess 46a. A splined annular support member 47 is fixedly mounted on the output shaft 13. A plurality of first frictional elements 48 are slidably but non-rotatably mounted on a rear portion of the support member 47 by means of spline-fittings, while a plurality of second frictional elements 49 are slidably but non-rotatably supported by the cylindrical member 46 using outer peripheral projections which are received in intermittently arranged cut-outs 46b in the cylindrical member 46. The first and second frictional elements 48 and 49 are arranged alternately within the cylindrical member 46. The brake 45 is thus fashioned into a frictional brake which is operative to brake the output shaft 13 by a frictional engagement between the first and second frictional elements 48 and 49.

A sleeve 50 is mounted on a front portion of the support member 47 through plain bearings. The cylindrical member 46 includes, at its front end, an inner diameter-reduced portion at which the member 46 is slidably received by the sleeve 50. The cylindrical member 46 has, at an inner surface of its rear end portion, a pressure ring 51, secured thereto, which is located behind the first and second frictional elements 48 and 49. The sleeve 50 has, at its rear end, an integral reaction ring portion 50a which is located in front of the first and second frictional elements 48 and 49. One or more coil springs 52 are received, at their rear ends, by the front surface of the ring portion 50a. These coil springs 52 act, at their front ends, upon the inner diameter-reduced portion of the cylindrical member 46 such that they bias the cylindrical member and pressure ring 51 to move forwardly and to thereby push the first and second frictional members 28 and 29 against the reaction ring portion 50a to cause a frictional engagement therebetween.

Figure 5A:
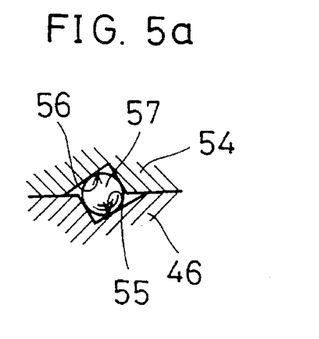
FIGS. 5a and 5b are sectional views of cam shown in FIG. 2.
Figure 5B:
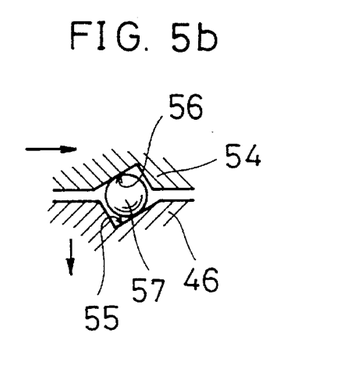
Figure 6:
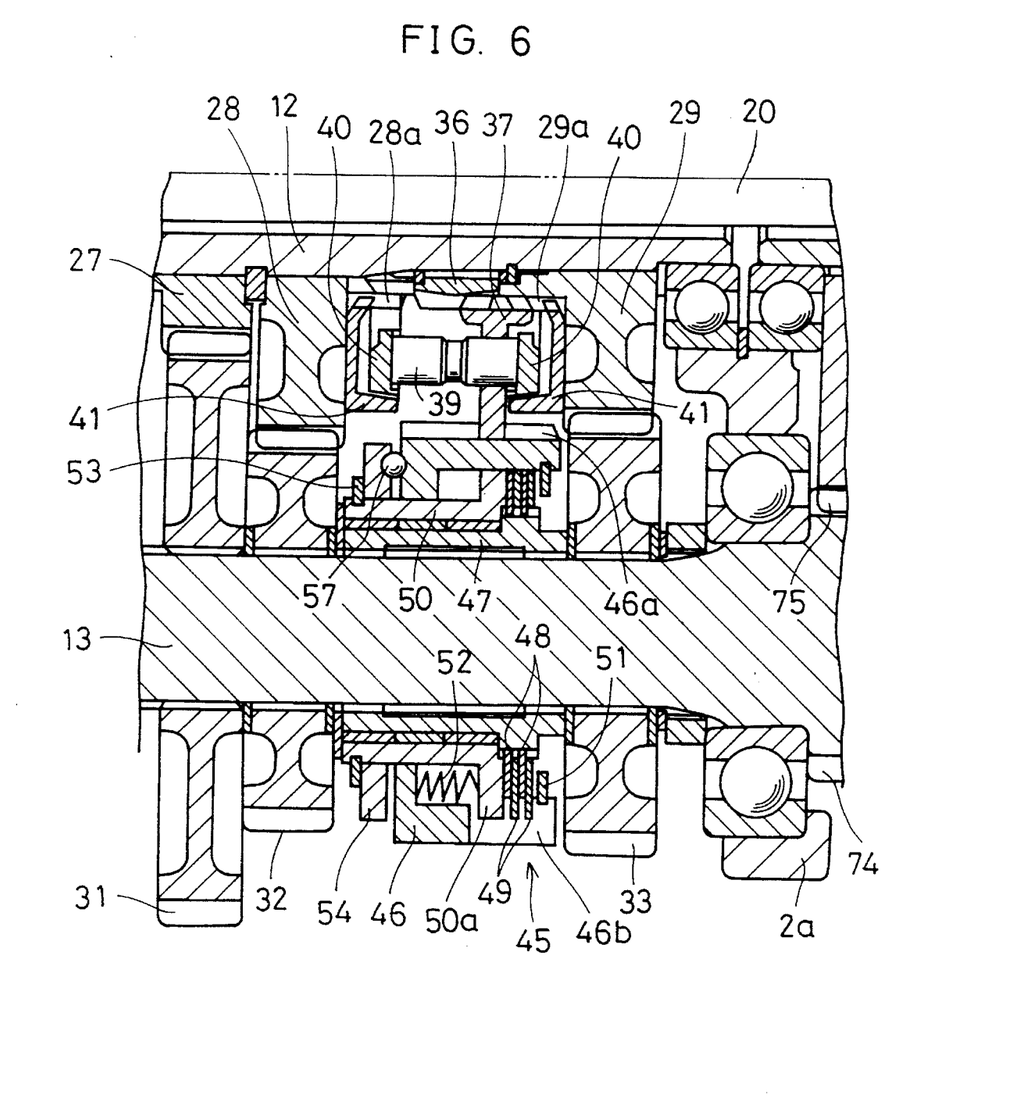
FIG. 6 is an enlarged view of a part of FIG. 2 showing a different condition.

For operating the cylindrical member 46 to move rearwardly so as to move the pressure ring 51 away from the frictional elements 48 and 49 and to thereby release the engagement between these frictional elements, a ring member 54 is rotatably mounted on a front end portion of the sleeve 50. This ring member 54 is in a face-to-face relationship with the inner diameter-reduced front end portion of the cylindrical member 46 and is prevented from getting-out by a snap ring 53 on the sleeve 50. The front end surface of the cylindrical member 46 and the rear surface of the ring member 54 each include therein plural or three pairs of cam grooves 55 and 56 which are inclined in the circumferential direction of these members 46 and 54, as shown in FIGS. 5a and 5b. A ball 57 is received in each pair of the cam grooves 55 and 56. Consequently, when the ring member 54 is rotationally displaced, each ball 57 located in deep portions of the cam grooves 55 and 56, as shown in FIG. 5a, is displaced to shallow portions of the cam grooves, as shown in FIG. 5b, so as to push the cylindrical member 46 to move rearwardly. By such a rearward movement of the cylindrical member 46, the pressure ring 51 is displaced rearwardly so that the first and second frictional elements 48 and 49 are disengaged from each other. FIG. 6 illustrates such a disengaged condition between the first and second frictional elements 48 and 49 where braking of the output shaft 13 by the brake 45 is released.

Figure 7:
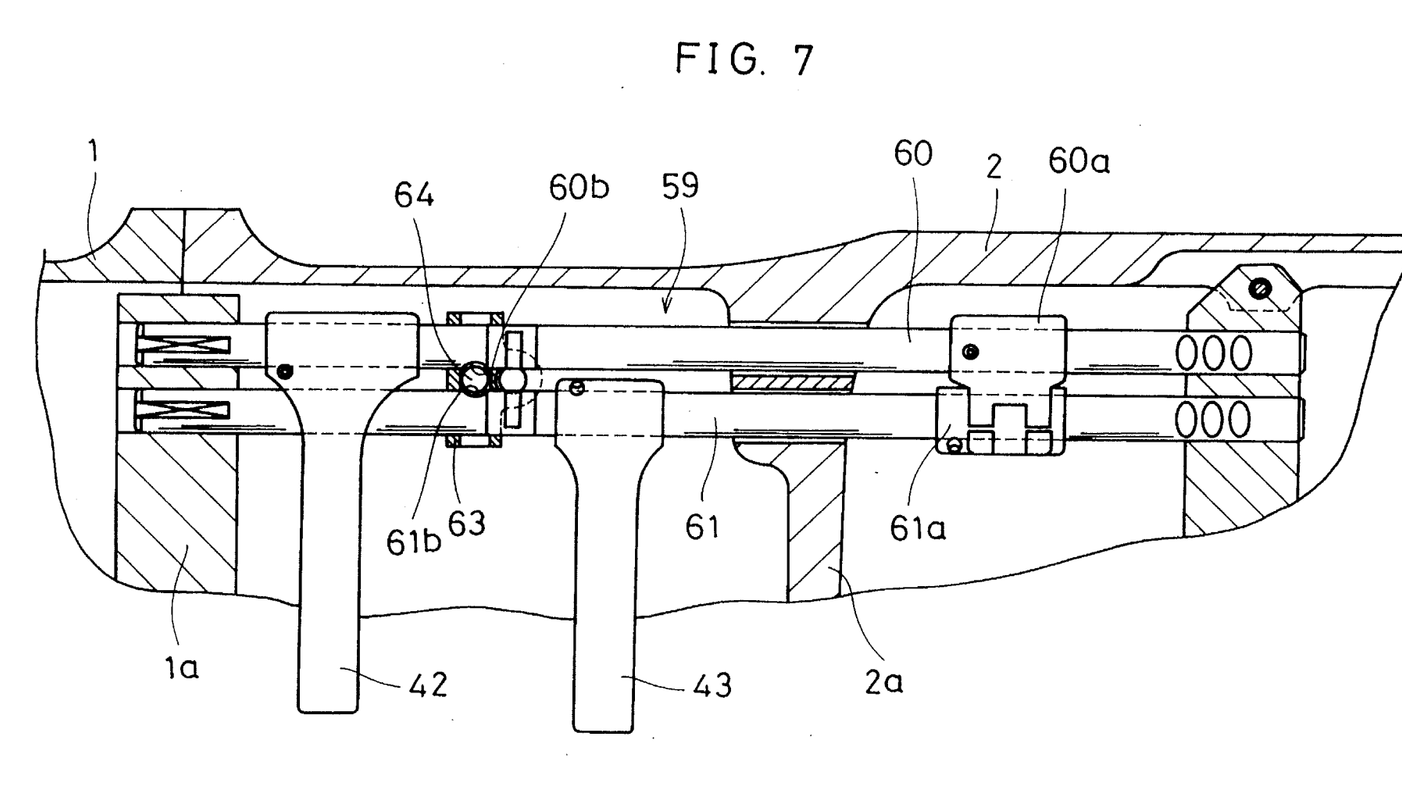
FIG. 7 is a cross-sectional plane view, partially omitted, of a part of the tractor.
Figure 8:
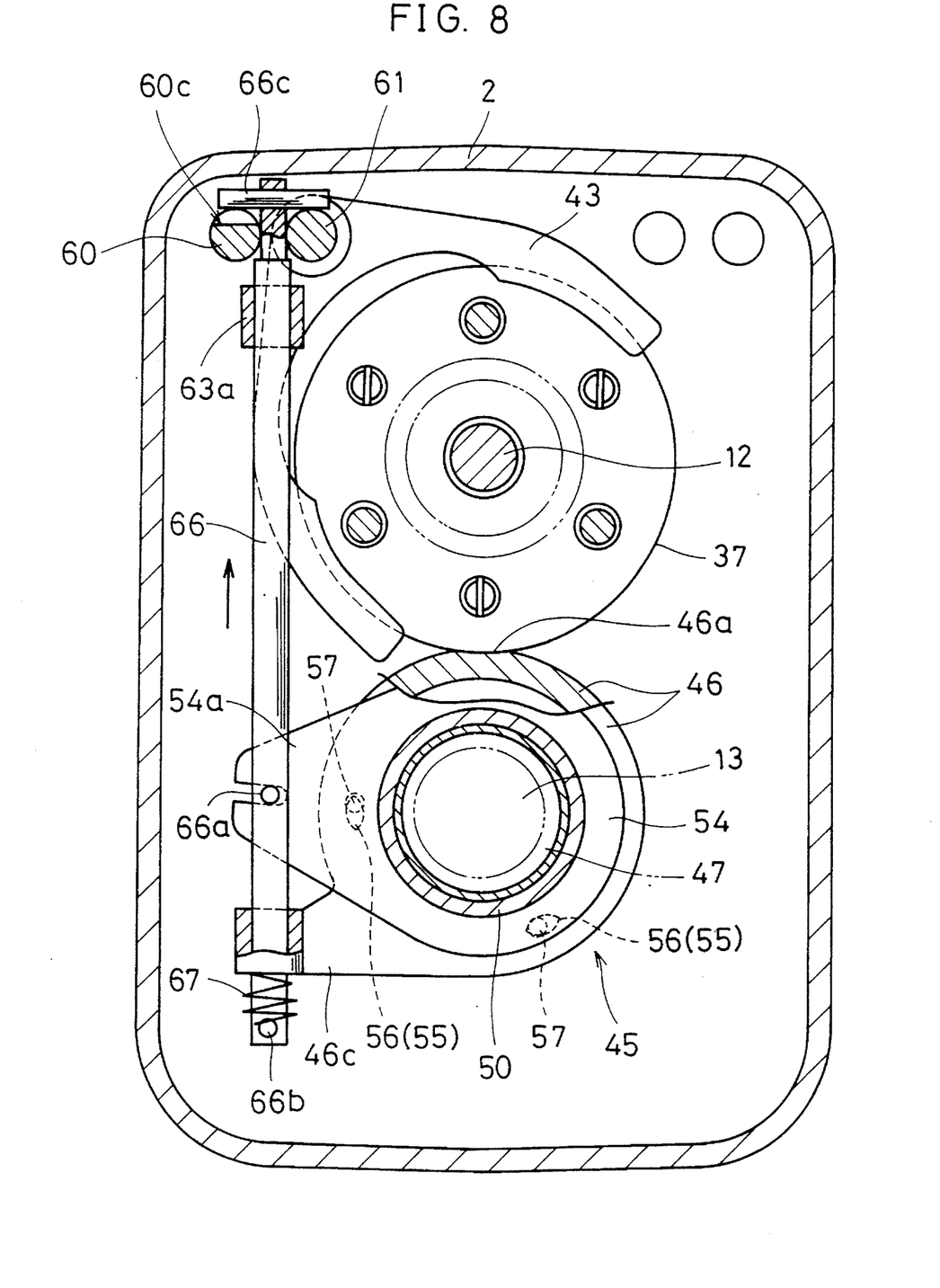
FIG. 8 is a vertical sectional view similar to FIG. 3 but showing another condition.

For controlling the operation of the synchronizer clutches 34 and 35 so as to shift the primary speed change mechanism 14, a control mechanism 59 shown in FIGS. 3 and 4 and in FIGS. 7 and 8 is provided. As shown in FIG. 7, the control mechanism comprises two fork-support shafts 60 and 61 which extend from an inside of a rear half of the transmission casing 2 forwardly into an inside of a front half of the transmission casing. These support shafts are slidably supported by the support wall 2a and by the bearing support frame 4. The shifter fork 43 set forth above by referring to FIG. 2 is attached to one of the fork-support shafts 61, whereas a shifter fork 42 for operating the synchronizer clutch 34 shown in FIG. 1 is attached to the other fork-support shaft 60. In FIG. 4, character 62 designates a slidable and rotatable control shaft which extends through a side wall of the transmission casing 2. This control shaft 62 carries, at its inner end, an operating pin 62a which is selectively engageable with any one of engaging members 60a and 61a, fixedly mounted on the support shafts 60 and 61, by a selective sliding displacement given to the control shaft 62. The control shaft 62 is then rotationally displaced so as to slidingly displace the fork-support shaft 60 or 61 and to thereby operate the clutch 34 or 35 through the shifter fork 42 or 43 shown in FIG. 7.

As shown in FIGS. 4 and 7, a locking member 63 through which the fork-support shafts 60 and 61 extend is disposed within a front half of the transmission casing 2 and is fixed in position. This locking member 63 includes in it a ball 64 which is located between the support shafts 60 and 61. The support shafts 60 and 61 have, in their outer surfaces, arc-shaped recesses 60b and 61b which are aligned, at a neutral condition of the primary change mechanism 14 where both of the synchronizer clutches shown in FIG. 1 are disengaged and where the fork-support shafts 60 and 61 are located at the positions shown in FIG. 7, with each other and with the ball 64. These locking member 63 and ball 64 constitute an interlocking mechanism for the primary speed change mechanism 14. The fork-support shaft 60 or 61 can be slidingly displaced from the condition shown in FIG. 7, because the ball 64 is pushed by the outer surface of this support shaft to enter the recess 61b or 60b of the other support shaft 61 or 60. However, in a condition where any one of the fork-support shafts 60 or 61 is located at a clutch-engaging position, the other fork-support shaft 61 or 60 cannot be slidingly displaced from its neutral position because the ball 64 engages lockingly with the recess of this support shaft.

The above-referenced ring member 54 is operatively connected to the control mechanism 59 in a fashion which will be detailed hereinafter. As shown in FIGS. 3 and 4, the cylindrical member 46 has an integral support arm portion 46c which extends sidewards. A vertical rod 66 is disposed at one side within the transmission casing 2 and is slidably supported by the arm portion 46c. The lock member 63 also has an integral support arm portion 63a which extends sidewards from the bottom of lock member 63. Rod 66 is also supported slidably, at an upper end portion thereof, by the arm portion 63a. The ring member 54 has an integral fork-shaped arm portion 54a which extends towards the rod 66. Rod 66 has a pin 66a, secured thereto, with which the arm portion 54a is engaged such that, when the rod 66 is slidingly moved, the ring member 54 is rotationally displaced. Another pin 66b is secured to a lower end portion of the rod 66, and a coil spring 67 is disposed on the rod 66 and between the pin 66b and the arm portion 46c such that rod is biased to move downwardly by this spring 67. Rod 66 includes a flattened uppermost end portion which is sandwiched between the fork-support shafts 60 and 61. Fork-support shafts 60 and 61 include, in their upper surfaces, recessed cam surfaces 60c and 61c each of which is deepest at its axial mid portion and becomes shallower from the mid portion towards one and the other axial directions. A follower pin 66c is secured to the rod 66 and engages cam surfaces 60c and 61c by the biasing force of the spring 67. FIGS. 3 and 4 also illustrate the neutral condition of the primary change mechanism 14 where both of the synchronizer clutches 34 and 35 shown in FIG. 1 are disengaged. Cam surfaces 60c and 61c are arranged such that they are aligned with each other, as shown, at this neutral condition and such that the follower pin 66c engages the deepest portions of these cam surfaces at the neutral condition of the change mechanism 14. The brake 45 is fashioned such that the first and second frictional elements 48 and 49 are in engagement, as shown in FIG. 2, at the neutral condition of the change mechanism 14 by the biasing force of coil springs 52 so that the output shaft 13 is braked.

According to the structure detailed above, when any one of the fork-support shafts 60 and 61 is slidingly displaced forwardly or backwardly from its neutral position, the follower pin 66c is relatively displaced from the deepest portion to a shallower portion of the cam surface 60c or 61c so that rod 66 is pulled upwardly. FIG. 8 illustrates a condition where the fork-support shaft 61 has been displaced from its neutral position. In this condition, the follower pin 66c is apart from the cam surface 61c forwardly or rearwardly and the rod 66 is in its raised position so that a rotational displacement has been given to the ring member 54. By such a rotational displacement of the ring member 54, balls 57 disposed between the ring member 54 and the cylindrical member 46 are displaced from deep portions to shallow portions of the cam grooves 55 and 56, as described above, so that the cylindrical member 46 and pressure ring 51 are displaced rearwardly whereby engagement between the first and second frictional elements 48 and 49 is released to result in the disactuated condition of brake 45 shown in FIG. 6. Consequently, braking of the output shaft 13 is released when the primary speed change mechanism 14 is in an operative condition in which any one of the clutch portions of the double-acting synchronizer clutch 34 or 35 is in an engaged condition.

A very small distance of the sliding displacement of cylindrical member 46 is satisfactory for disactuating the brake 45, so that it is accommodated by the clearance between the support arm portion 46c and the rod 66. The locking member 63 shown in FIGS. 4 and 7 can be fixed in position either using only the rod 66 shown as a support or further using an additional support (not shown) secured to the transmission casing 2.

When the control mechanism 59 is operated so as to place the primary change mechanism 14 in its neutral condition, the follower pin 66c is positioned in the deepest portions of cam surfaces 60c and 61c of the fork-support shafts 60 and 61, as shown in FIGS. 3 and 4, so that rod 66 is lowered by the biasing force of the spring 67. By this downward movement of rod 66, the ring member 54 is rotationally displaced through the pin 66a to the position shown in FIG. 5a so that the brake-actuated condition shown in FIG. 2 is attained.

The direction-reversing mechanism 9 shown in FIG. 1 comprises a drive gear 70 which is rotatably mounted on the primary shaft 7, an intermediate gear 71 which is fixedly mounted on the countershaft 11 and is meshed with the drive gear 70 through an idler gear (not shown), and another intermediate gear 72 which is fixedly mounted on the countershaft 11 and is meshed with the output gear 10. A double-acting synchronizer clutch 73 of frictional disc type is mounted on the primary shaft 7 and is disposed between the drive gear 70 and the output gear 10. Output gear 10 is driven to rotate so as to transmit forward directional drive power when this gear is coupled to the primary shaft 7 by clutch 73, whereas output gear 10 is driven to rotate so as to transmit backward directional drive power when the drive gear 70 is coupled to the primary shaft 7 by clutch 73.

As also shown in FIG. 1, the output shaft 13 is drivingly connected to the intermediate shaft 15 through a reduction gearing of meshing gears 74 and 75. Two changing gears 76 and 77 are fixedly mounted on the intermediate shaft 15. A shifter gear 78, which is selectively meshable with gear 76, is slidably but non-rotatably mounted on the propeller shaft 16. A gear 79, which is in meshment with gear 77, is rotatably mounted on the propeller shaft 16. Further, a clutch member 80 is slidably but non-rotatably mounted on the propeller shaft 16 and is adapted to be displaced selectively to a position where gear 79 is coupled to the propeller shaft, and to another position where propeller shaft is connected directly to the output shaft 13 by the clutch member. The auxiliary speed change mechanism 17 shown in FIG. 1 provides for the propeller shaft 16 a first speed when gears 76 and 78 are meshed, a second speed when gear 79 is coupled to this shaft 16 by the clutch member 80, and a third speed when shaft 16 is connected directly to the shaft 13 by the clutch member 80. In FIG. 1, character 81 designates a pulley which is fixedly mounted on the propeller shaft 16. This pulley is employed as a member to be braked by a parking brake (not shown).

Figure 9:
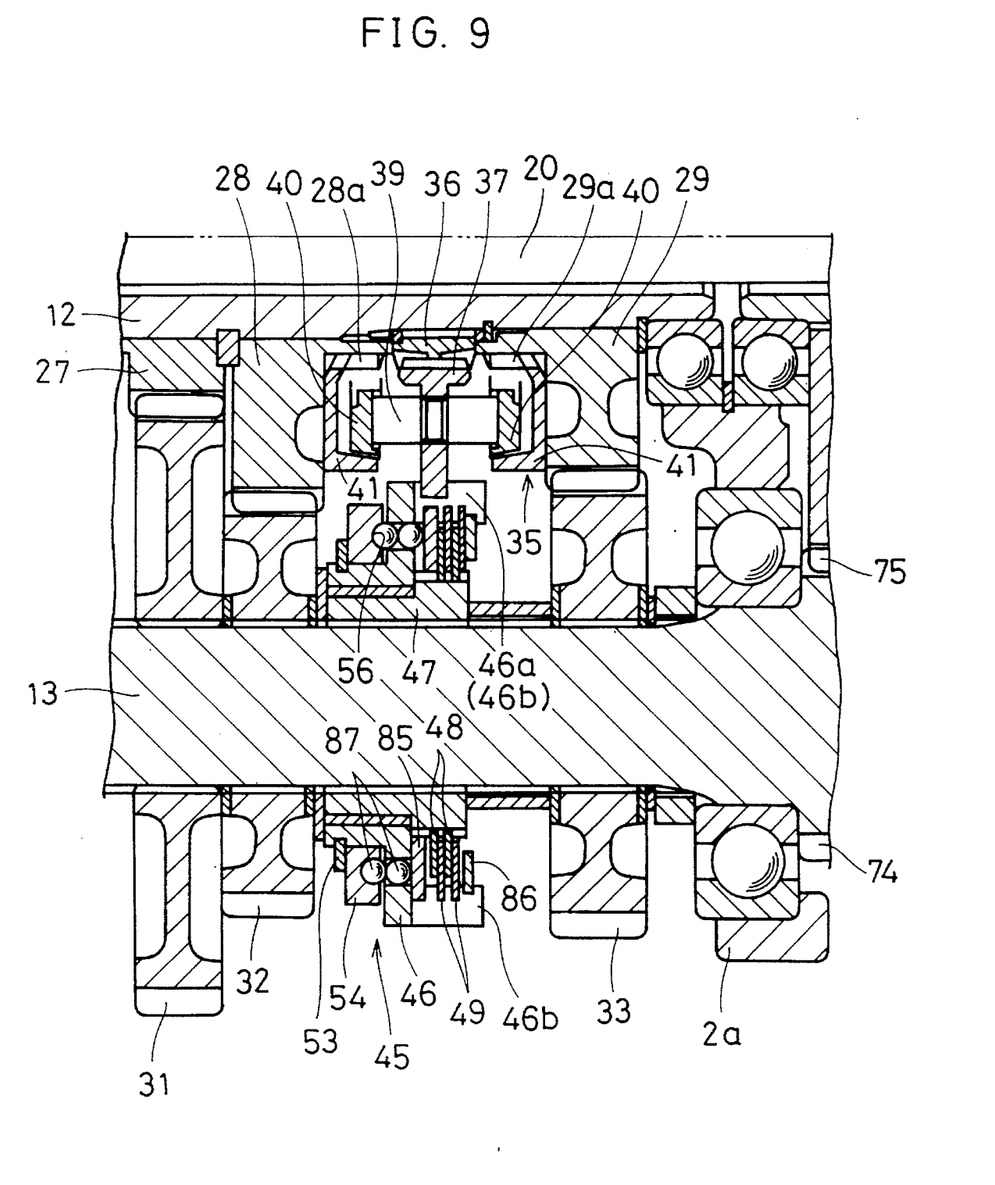
FIG. 9 is a sectional side view of a part of a tractor in which a second preferred embodiment of the transmission according to the present invention is employed.

FIG. 9 shows a second embodiment. Brake 45 employed in this embodiment is also fashioned into a frictional brake having a first set of frictional elements 48, which are slidably but non-rotatably supported by a splined annular support member 47 which in turn is fixedly mounted on the output shaft 13, and a second set of frictional elements 49 which are slidably but non-rotatably supported by a cylindrical member 46 which in turn is prevented from rotational displacement by the shifter 37 of the synchronizer clutch 35 similarly to the one employed in the first embodiment. In the second embodiment, however, the cylindrical member 46, which is received by a front portion of the support member 47 for relative rotation through a plain bearing, is kept from sliding displacement, as shown.

Within the cylindrical member 46, a pressure ring 85 is disposed in front of the two sets of frictional elements 48 and 49 and is slidably but non-rotatably supported by the cylindrical member. A reaction ring 86 is disposed behind the two sets of frictional elements 48 and 49 and is fixedly secured to the cylindrical member 46. A rotatable ring member 54, same as the one employed in the first embodiment, is disposed on a front end portion of the cylindrical member 46, and it includes, in its rear surface, cam grooves 56 similar to those shown in FIG. 5. The cylindrical member 46 includes, at its shoulder portion, through bores which are aligned axially with cam grooves 56. Pairs of balls 87, which engage pressure plate 85, are disposed in the aligned sets of cam grooves 56 and through bores.

The ring member 54 is adapted to be rotationally displaced by a mechanism same as that shown in FIGS. 3 and 4. An upper half of the brake 45 shown in FIG. 9 corresponds to the neutral condition of the primary speed change mechanism 14 where the rod 66 is in its lowered position shown in FIGS. 3 and 4. Ring member 54 is arranged such that shallow portions of the cam grooves 56 are faced to the balls 87 at the condition shown in FIG. 9 with respect to the upper half of brake 45 under the biasing of the spring 67 which biases the rod 66 to move downwardly. Consequently, balls 87 urge the pressure ring 85 by the force of spring 67 to move rearwardly so that a frictional engagement between the first and second frictional elements 48 and 49 is caused. A lower half of the brake 45 shown in FIG. 9 corresponds to an operating condition of the primary speed change mechanism 14 where the rod is in its raised position shown in FIG. 8. Ring member 54 is arranged such that deep portions of the cam grooves 56 are faced to the balls 87 at the condition shown in FIG. 9 with respect to the lower half of brake 45 due to a rotational displacement of the ring member 54 caused by the upward displacement of rod 66. Consequently, force of the spring 67 is not applied to balls 87 so that the engagement between the first and second frictional elements 28 and 29 is released, as shown. It is thus seen that the brake 45 employed in the second embodiment operates similarly to the one according to the first embodiment. A pair of balls 87 shown may be replaced by a pin.

While preferred embodiments of the invention have been described, it will be appreciated that various modifications and changes may be made without departing from the spirit and scope of the appended claims.

I claim:

1. In a vehicle transmission having a synchromesh speed-change mechanism (14) disposed between an input shaft (12) and an output shaft (13) which extend parallel with each other, said change mechanism including synchronizer clutches (34, 35) which are mounted on said input shaft, the improvement characterized in that a brake (45) is disposed on said output shaft (13) in a face-to-face relationship, as viewed in a direction across said input and output shafts (12, 13), with one (35) of said synchronizer clutches on said input shaft, said brake being operatively connected to a control mechanism (59) for controlling the operation of said synchronizer clutches (34, 35) such that said brake is actuated so as to brake said output shaft (13) when said speed change mechanism (14) is placed in its neutral condition.

2. The vehicle transmission as set forth in claim 1, wherein a hollow cylindrical member (46) is disposed on said output shaft (13) and is engaged by one element (37) of said one synchronizer clutch (35) such that said cylindrical member is kept from a rotational displacement by said one element, said brake (45) being composed of a frictional brake having first frictional elements (48), which are non-rotatably supported by said output shaft (13), and second frictional elements (49) which are non-rotatably supported by said cylindrical member (46).

3. The vehicle transmission as set forth in claim 2, wherein said cylindrical member (46) is slidably mounted on said output shaft (13), said first and second frictional elements (48, 49) being adapted to be engaged and disengaged in response to a sliding displacement of said cylindrical member, and wherein said cylindrical member (46) is operatively connected to said control mechanism (59) such that when said speed change mechanism (14) is placed in its neutral condition said cylindrical member is slidingly displaced to a position where said first and second frictional elements (48, 49) are engaged.

4. The vehicle transmission as set forth in claim 3, wherein a rotatable ring member (54) is mounted on said output shaft (13) in a face-to-face relationship with said cylindrical member (46), wherein cam means (55, 56, 57) is disposed between said ring member (54) and said cylindrical member (46) such that said cylindrical member is slidingly displaced in response to a rotational displacement of said ring member through said cam means, and wherein said ring member (54) is operatively connected to said control mechanism (59) through a ro (66), which is slidably supported by said cylindrical member (46), such that said ring member is rotationally displaced in response to a sliding movement of said rod.

5. The vehicle transmission as set forth in claim 4, wherein said control mechanism (59) includes plural fork-support shafts (60, 61) which are arranged in parallel with one another and are adapted to be slidingly displaced for controlling the operation of said synchronizer clutches (34, 35), said fork-support shafts including cam surfaces (60c, 61c) which are engaged by a follower member (66c) on said rod (66) such that said rod is slidingly moved in response to a sliding displacement of said fork-support shafts.

6. The vehicle transmission as set forth in claim 2, wherein said cylindrical member (46) is non-slidably mounted on said output shaft (13), and wherein pressure means (85, 87) for causing engagement between said first and second frictional elements (48, 49) is supported by said cylindrical member such that said pressure means is movable in an axial direction of said output shaft, said pressure means (85, 87) being operatively connected to said control mechanism (59) such that when said speed change mechanism (14) is placed in its neutral condition said pressure means is moved to a position where said first and second frictional elements (48, 49) are engaged.

7. The vehicle transmission as set forth in claim 6, wherein a rotatable ring member (54) is mounted on said output shaft (13) in a face-to-face relationship with said pressure means (85, 87), said ring member including a cam portion (56) for causing said pressure means to move when said ring member is rotationally displaced, and wherein said ring member (54) is operatively connected to said control mechanism (59) through a rod (66), which is slidably supported by said cylindrical member (46), such that said ring member is rotationally displaced in response to a sliding movement of said rod.

8. The vehicle transmission as set forth in claim 7, wherein said control mechanism (59) includes plural fork-support shafts (60, 61) which are arranged in parallel with one another and are adapted to be slidingly displaced for controlling the operation of said synchronizer clutches (34, 35), said fork-support shafts including cam surfaces (60c, 61c) which are engaged by a follower member (66c) on said rod (66) such that said rod is slidingly moved in response to a sliding displacement of said fork-support shafts.

* * * * *